June 5, 1928.

L. D. JURS 1,672,533

LIQUID DISPENSING APPARATUS

Filed July 30, 1924   3 Sheets-Sheet 1

INVENTOR
Louis D. Jurs by White Prost & Evans
his ATTORNEYS

INVENTOR
Louis D. Jurs
by White Prost Prouse
his ATTORNEYS.

June 5, 1928.

L. D. JURS 1,672,533

LIQUID DISPENSING APPARATUS

Filed July 30, 1924   3 Sheets-Sheet 3

INVENTOR
Louis D. Jurs by White Prost & Evans
his ATTORNEYS

Patented June 5, 1928.

1,672,533

UNITED STATES PATENT OFFICE.

LOUIS D. JURS, OF SAN FRANCISCO, CALIFORNIA.

LIQUID-DISPENSING APPARATUS.

Application filed July 30, 1924. Serial No. 729,091.

The invention relates to a liquid dispensing apparatus and particularly to an apparaus for dispensing gasoline to automobiles and motor trucks.

An object of the invention is to provide a gasoline dispensing apparatus having a large volume indicating dial, so that the customer may readily observe the amount of gasoline which has been introduced into the tank of his automobile.

Another object of the invention is to provide a liquid dispensing apparatus in which the dial may be readily reset to zero after each dispensing operation.

Another object of the invention is to provide a liquid dispensing apparatus having a meter through which the liquid passes, which meter is connected to a large visible dial which rotates in time with the operation of the meter.

A further object of the invention is to provide a gasoline dispensing apparatus which indicates the price of the dispensed amount of gasoline at the current price per gallon.

A further object of the invention is to provide a gasoline dispensing apparatus having means for insuring that the customer receives the full amount of gasoline which is indicated on the dial.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of dispensing apparatus embodying my invention, but it is to be understood that I do not limit myself to such form, since the invention, as set forth in the claims, may be embodied in a plurality of forms.

Referring to said drawings.

Figure 1:
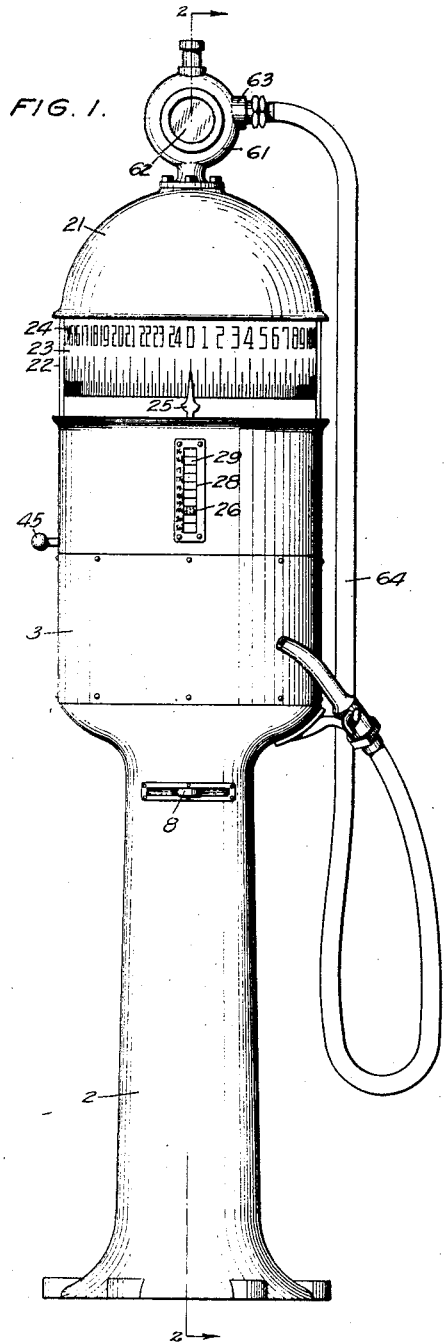
Figure 1 is a side elevation of one form of dispensing apparatus embodying my invention.

The apparatus of my invention is particularly adapted for use at service stations in the dispensing of various quantities of gasoline to automobiles and motor trucks. The apparatus enables the driver of the vehicle to readily observe the quantity of gasoline which has been introduced into the tank of the vehicle and permits gallons and fractions of gallons of gasoline to be accurately dispensed and measured. The apparatus is further constructed in such a manner that the driver is insured of obtaining the full quantity of gasoline shown by the indicator. The gasoline may be dispensed by a pump or may be dispensed by static pressure.

The apparatus of my invention comprises a pedestal 2 on which is mounted a suitable casing 3. Suitably supported within the casing is a liquid meter 4 of suitable construction, such for instance as the meter disclosed in the Granberg Patent No. 1,460,715 of July 3, 1923. This meter is provided with a shaft 5, the movement of which is proportional to the amount of liquid passed through the meter and this shaft, in the present construction, is suitably connected to an indicating device to indicate the volume of liquid which has passed through the meter. Gasoline is supplied to the meter through the inlet pipe 6 which is disposed within the hollow pedestal 2 and this pipe is preferably provided with a shut-off valve 7 to prevent the flow of gasoline through the pipe when gasoline is not being dispensed. The valve 7 is operated by a lever 8 extending through an aperture in the wall of the pedestal, so that the valve may readily be operated. The gasoline may be forced through the pipe 6 by a pump 12 arranged within the pedestal and operated by the hand crank 13 or it may be taken from a source of supply in which the gasoline is maintained under pressure, or may be forced through the pipe by a mechanically or electrically driven pump which may be manually or automatically controlled. When desirable, a plurality of dispensing devices may be connected to a single supply pipe in which the gasoline is maintained under pressure either by means of a pump or a pressure head.

The gasoline passes from the pipe 6 into the meter 4, causing operation of the meter and rotation of the shaft 5 and discharges from the meter through the pipe 14 which is in communication with a chamber within the supporting element 15. The supporting element 15 is mounted on standards 16, which are in turn mounted on the pedestal, and serves as a support for the indicating dial. Mounted on the supporting element 15 and in communication with the chamber therein is a standpipe 17 through which the gasoline passes.

Journalled on the supporting member 15 is a rotatable element 18 forming the web of dial drum 19. The standpipe 17 is preferably concentric with the casing 3 and the dial drum 19 is of slightly smaller diameter than the internal diameter of the casing. Mounted on the standpipe 17 at its upper end, is a hood 21, the lower end of which is spaced apart from the upper edge of the casing and the space between the hood and the casing is closed by a transparent plate 22, preferably comprising a cylindrical sheet of glass. Secured to the dial drum 19 is a cylindrical dial sheet 23, the upper portion 24 of which is visible through the glass plate 22. The upper portion 24 of the sheet is calibrated to indicate gallons and fractions of gallons or other units of volume measure and these calibrations preferably comprise two series of figures, each series extending for 180 degrees around the surface of the sheet. At each side of the casing at points 180 degrees apart, are pointers 25 overlying the sheet 24 so that the amount of gasoline dispensed may be observed from either side of the apparatus. As gasoline is dispensed, the dial drum is rotated past the pointers 25 and the extent of rotation is dependent upon the amount of gasoline passing through the meter, so that the pointers indicate the amount of gasoline dispensed.

The lower portion 26 of the dial sheet 23 is provided with figures indicating the cost price of the amount of gasoline dispensed, at various prices per gallon. Under each calibration of the dial 24, representing gallons and fractions of gallons, is a vertical row of figures giving the cost of the amount of gasoline indicated by the figures on the dial 24 at various prices per gallon. In the present instance these prices range from 16 cents to 20½ cents per gallon.

The casing 3 is provided at opposite sides, directly below the pointers 25, with vertically elongated apertures 28 through which the figures on the lower portion 26 of the dial sheet are visible. As the dial drum 19 is rotated the dial sheet 26 moves therewith so that there is exposed at the aperture 28, figures indicating the cost price of the amount of gasoline dispensed. Means are also provided for closing the slot 28 except at the plane representing the current price of gasoline per gallon, so that there is exposed in the slot 28 only those figures which represent the cost price of the gasoline at current prices. The slot 28 may be partially closed in any desirable manner and in the present instance I have shown a plurality of slide pieces 29 arranged in the slot and by sliding these pieces, any desirable series of figures may be shown. In Figure 1 the slide pieces 29 are disposed to indicate the cost price of the amount of gasoline dispensed at the rate of 19½ cents per gallon.

The shaft 5 of the meter 4 is suitably connected to the web 18 of the dial drum so that the drum rotates in time with the shaft 5. Secured to the upper end of the shaft 5 is a pinion 31 which meshes with a gear 32 which in turn meshes with a gear 33 which is secured to the drum rotating shaft 34. The shaft 34 is journalled in a sliding sleeve 35 which is fitted within a bore 36 in the supporting member 15, and at its upper end the shaft 34 is provided with a pinion 37 which meshes with an internal gear 38 on the drum web 18. The sleeve 35 and consequently the shaft 34 are movable vertically to move the pinion 37 out of engagement with the gear 38. The sleeve 35 is normally held in its upward position, with the pinion 37 in mesh with the gear 38, by the spring 41 interposed between the sleeve 35 and the bottom of the bore 36. The gear 33 is splined to the shaft 34 and means are provided for moving the shaft 34 vertically. At its lower end, the shaft 34 is provided with a shouldered head 42 which is engaged by the bifurcated end of the bell crank lever 43, which is pivoted within the casing. Secured to the other end of the lever is a rod 44 which extends to the outside of the casing where it is provided with a head 45. The rod 44 is normally held in extended position by the spring 46 and by exerting inward pressure against the head 45, the bell crank lever 43 is rocked to depress the shaft 34 and remove the pinion 37 from engagement with the gear 38.

Means are provided for returning the dial drum 19 to zero position when the drum is disconnected from the meter. Connected to the drum web 18 is a helical spring 47 which is connected at its other end to the supporting member 15, and this spring is placed under increased tension as the dial drum is rotated by the meter. When the meter is disconnected from the drum, the spring moves the drum backward and its backward rotation is halted at the zero position by the stop pin 48 on the drum engaging the stop 49 on the supporting member 15. After a quantity of gasoline has been dispensed, say for instance, 15 gallons, and the amount and cost of the gasoline has been observed by the purchaser, the attendant pushes in the head 45 to release the meter from the dial drum and the drum then returns to zero position, at which time pressure on the head 45 is released so that the drum is again connected to the meter. The drum therefore operates to indicate the volume of the unit charges dispensed by the apparatus and further means are provided for indicating the total amount of gasoline which has been dispensed. Meshing with the gear 32 is a gear 51 which is suitably connected to the sprocket 52 so that the sprocket rotates in time with the gear 31. Arranged within the casing, adjacent the side wall thereof and immediately behind a sight opening 53 in the casing is a counter 54 which is connected to the sprocket 52 by the chain 55. The counter indicates the total amount of gasoline which has been dispensed and may be readily observed by the proper authority to provide a check on the attendant.

The dial drum 18 is preferably mounted on ball bearings 56 so that it may be readily rotated by the meter and so that it will freely return to the zero position. Means are provided for supplying lubricant to the bearing 56 and for this purpose, an oil pipe 57 opening at its upper end into the oil cup 58 arranged on the hood 21 is provided.

Means are provided for insuring against back drainage through the dispensing apparatus and for insuring the purchaser that he is receiving the full quantity indicated on the dial. Connected to the standpipe 17 at its upper end and disposed above the hood 21 is a chamber 61 into which the gasoline passes. This chamber is preferably provided at opposite sides with circular windows 62 so that the amount of gasoline in the chamber may be observed and the chamber is provided with an outlet port 63 to which the flexible dispensing hose 64 is connected. The lower surface of the outlet port 63 is preferably in line with the center of the window 62, so that the gasoline stands in the chamber 61 at the level of the center of the window. When the level is below the center of the window, it is an indication that gasoline has drained backward through the apparatus, and the attendant will cause sufficient gasoline to flow into the chamber 61 to bring the gasoline up to the proper level. The shut-off valve 7 should be closed as soon as the desired quantity of gasoline has been dispensed, so that there will be no back drainage of gasoline. The customer is therefore always insured of obtaining full measure.

Figure 4:
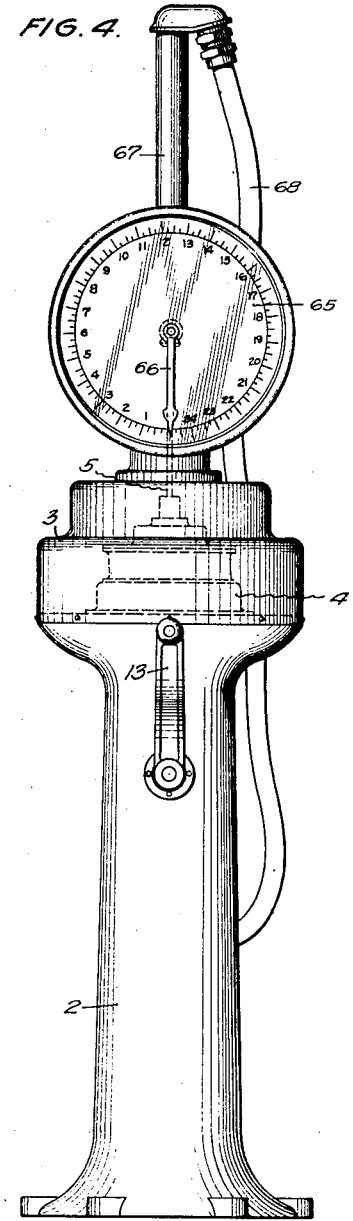
Figure 4 is an elevation of a modified form of dispensing apparatus embodying my invention.
Figure 2:
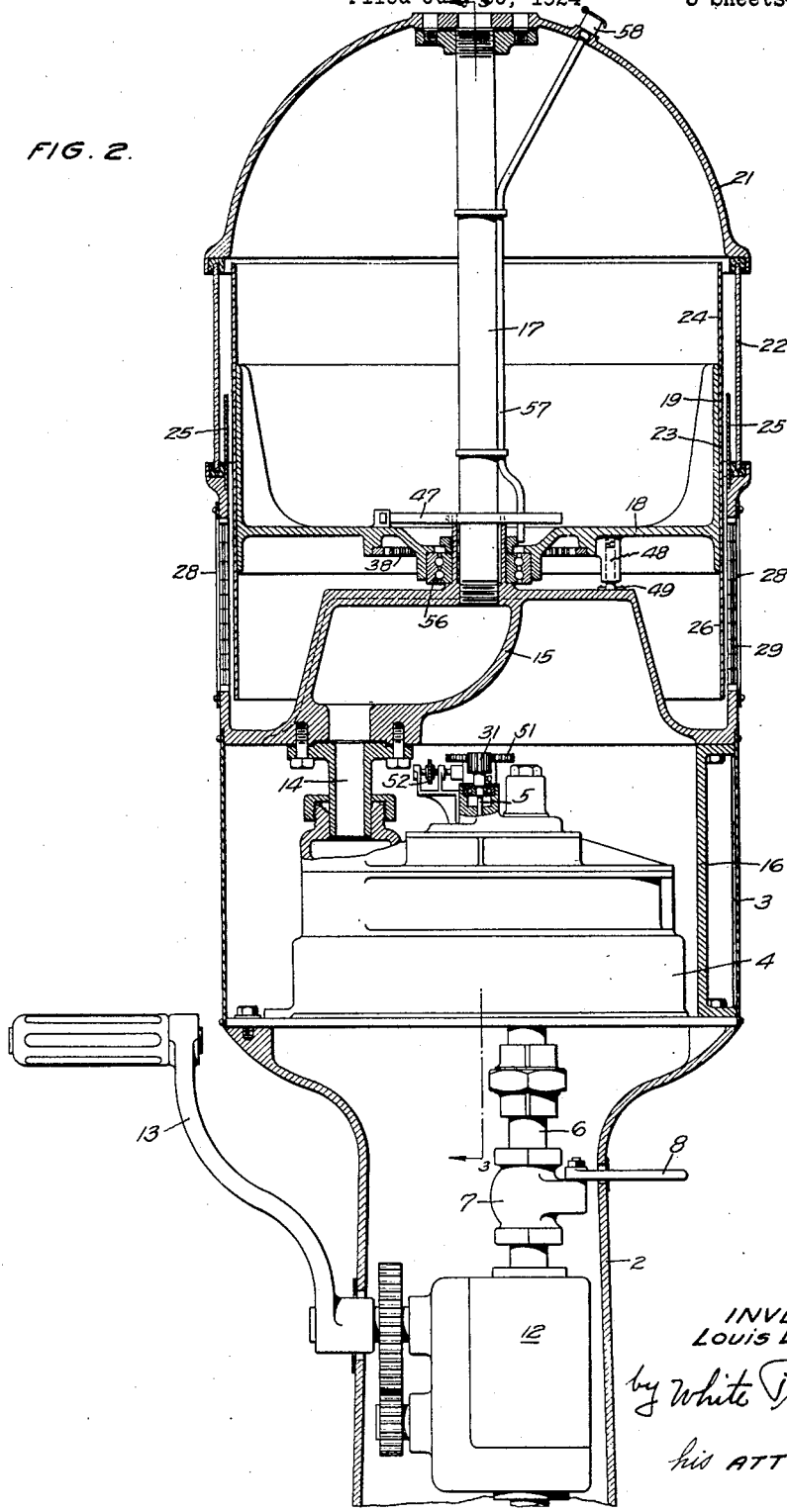
Figure 2 is a cross section taken on the line 2—2, Figure 1, the lower part of the structure being removed to decrease the size of the figure.
Figure 3:
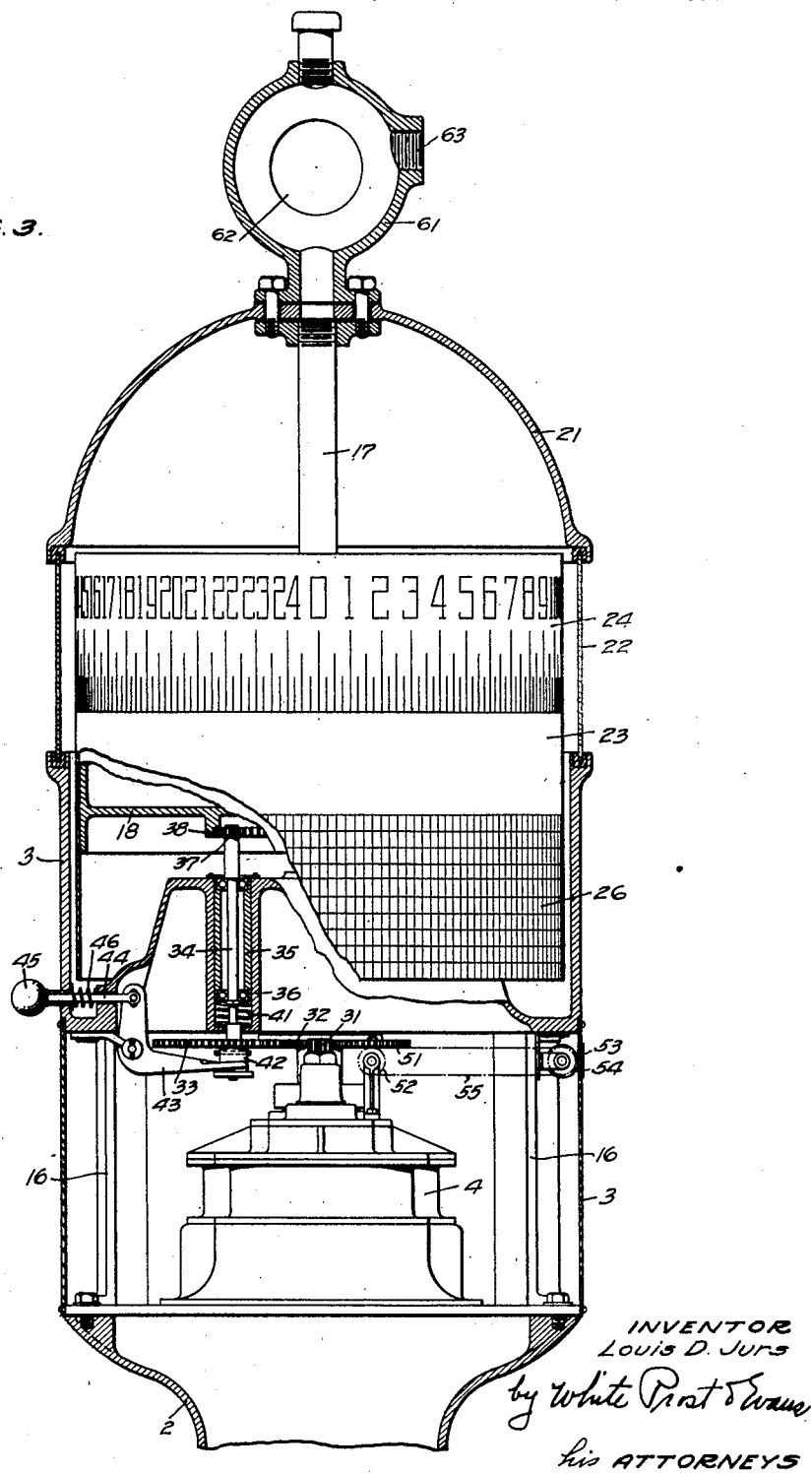
Figure 3 is a section taken on the line 3—3, Figure 2.

In the construction shown in Figure 4 I have shown a modified arrangement in which the large visible dial is vertically arranged. In this structure the dial 65 is calibrated to indicate the number of gallons and fractions of gallons dispensed and the indicating hand 66 is connected to the shaft 5 of the meter so that the number of gallons dispensed is indicated on the dial. From the meter the gasoline passes upward through the standpipe 67 whence it flows through the flexible dispensing conduit 68. Both forms of the invention embody a large visible dial which indicates the amount of gasoline dispensed and since the meter is accurate, the reading of the dial is accurate and any leaky valves or inaccuracies of the pump, will not result in the dispensing of an improper amount of gasoline. Meters of the character referred to are extremely accurate so that the dispensing apparatus of my invention is accurate to indicate the exact amount of gasoline dispensed. By connecting a plurality of these devices to a single supply pipe in which the gasoline is maintained under pressure, the gasoline may not only be more accurately dispensed but may be more readily dispensed, since the system does not involve necessarily the use of a reciprocating pump, the volume of the chamber of which is the unit of measure.

I claim:

1. A liquid dispensing apparatus comprising a meter through which the liquid passes, said meter having a shaft, the movement of which is proportional to the amount of liquid passed through the meter, a dial connected to said shaft, means tending to return the dial to zero position and means for disconnecting the dial from the shaft.

2. A liquid dispensing apparatus comprising a meter through which the liquid passes, said meter having a shaft, the movement of which is proportional to the amount of liquid passed through the meter, a dial connected to said shaft, means tending to rotate the dial in a direction opposite to the rotation produced by the shaft, means for disconnecting the dial from the shaft and means for stopping the reversely rotating dial at zero position.

3. A liquid dispensing apparatus comprising a meter through which the liquid passes, said meter having a shaft, the movement of which is proportional to the amount of liquid passed through the meter, a dial connected to said shaft, a spring for returning the dial to zero position and means for disconnecting the dial from the shaft.

4. A liquid dispensing apparatus comprising a meter through which the liquid passes, said meter having a shaft, the movement of which is proportional to the amount of liquid passed through the meter, a drum dial connected to said shaft, a spring opposing the rotation of said drum and means for disconnecting the shaft from the drum.

5. A liquid dispensing apparatus comprising a meter through which the liquid passes, said meter having a shaft, the movement of which is proportional to the amount of liquid passed through the meter, a conduit through which liquid discharges from the meter, a dial drum surrounding said conduit and means connecting the drum with said shaft.

6. A liquid dispensing apparatus comprising a meter through which the liquid passes, said meter having a shaft, the movement of which is proportional to the amount of liquid passed through the meter, a conduit through which liquid discharges from the meter, a dial drum mounted on and surrounding said conduit and means connecting the drum with said shaft.

7. A liquid dispensing apparatus comprising a casing, a drum dial adapted to rotate about a vertical axis, partly concealed in said casing, figures on said dial to indicate the number of gallons of liquid dispensed and a vertical row of figures associated with each of said prior figures to indicate the cost price of the dispensed amount of liquid at different prices per gallon.

8. A liquid dispensing apparatus comprising a casing, a drum dial adapted to rotate about a vertical axis, partly concealed in said casing, figures on said dial to indicate the number of gallons of liquid dispensed and a vertical row of figures associated with each of said prior figures to indicate the cost price of the dispensed amount of liquid at different prices per gallon, said casing being provided with a vertical slot through which the vertical rows of figures are visible as the drum rotates.

9. A liquid dispensing apparatus comprising a casing, a drum dial adapted to rotate about a vertical axis, partly concealed in said casing, figures on said dial to indicate the number of gallons of liquid dispensed and a vertical row of figures associated with each of said prior figures to indicate the cost price of the dispensed amount of liquid at different prices per gallon, said casing being provided with a vertical slot behind which the vertical rows of figures pass as the drum rotates and means for partially closing the slot to display only one figure in each vertical row.

10. A liquid dispensing apparatus comprising a casing, a liquid meter arranged in the casing, a volume indicating dial arranged for rotation about a vertical axis and disposed in the casing above the meter and means connecting the meter with the indicating dial.

11. A liquid dispensing apparatus comprising a casing, a liquid meter arranged in the casing, a hood arranged over and spaced from the casing and a volume indicating dial connected to the meter and exposed in the space between the casing and the hood.

12. A liquid dispensing apparatus comprising a casing, a liquid meter arranged in the casing, a vertically disposed discharge pipe connected to the meter, a hood mounted on the discharge pipe and spaced above the casing and a volume indicating dial connected to the meter and disposed between the casing and the hood.

13. A liquid dispensing apparatus comprising a casing, a liquid meter arranged in the casing, a volume indicating dial, means releasably connecting the dial with the meter, and a counter permanently connected to the meter.

In testimony whereof I have hereunto set my hand.

LOUIS D. JURS.